United States Patent
Fridakis

(10) Patent No.: US 10,140,453 B1
(45) Date of Patent: Nov. 27, 2018

(54) VULNERABILITY MANAGEMENT USING TAXONOMY-BASED NORMALIZATION

(71) Applicant: Amazon Technologies, Inc., Seattle, WA (US)

(72) Inventor: Stephen George Fridakis, Briarcliff Manor, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/659,019

(22) Filed: Mar. 16, 2015

(51) Int. Cl.
  *G06F 11/00* (2006.01)
  *G06F 21/57* (2013.01)

(52) U.S. Cl.
  CPC ...... *G06F 21/577* (2013.01); *G06F 2221/034* (2013.01)

(58) Field of Classification Search
  CPC .................. G06F 21/577; G06F 2221/34
  See application file for complete search history.

(56) References Cited

U.S. PATENT DOCUMENTS

| | | | |
|---|---|---|---|
| 7,882,349 B2 | 2/2011 | Cam-Winget et al. | |
| 8,365,290 B2 | 1/2013 | Young | |
| 8,789,192 B2 | 7/2014 | LaBumbard | |
| 8,793,790 B2 | 7/2014 | Khurana et al. | |
| 8,839,441 B2 | 9/2014 | Saxena et al. | |
| 8,880,893 B2 | 11/2014 | Moghe et al. | |
| 9,235,606 B1* | 1/2016 | Mooney | G06F 17/30073 |
| 2002/0199122 A1* | 12/2002 | Davis | G06F 21/577 |
| | | | 726/25 |
| 2003/0005326 A1* | 1/2003 | Flemming | G06F 21/31 |
| | | | 726/4 |
| 2004/0064726 A1 | 4/2004 | Girouard | |
| 2005/0257267 A1* | 11/2005 | Williams | H04L 63/1408 |
| | | | 726/25 |
| 2005/0288920 A1* | 12/2005 | Green | G06F 17/2785 |
| | | | 704/3 |
| 2006/0265324 A1* | 11/2006 | Leclerc | G06F 21/577 |
| | | | 705/38 |
| 2007/0067847 A1* | 3/2007 | Wiemer | H04L 63/1433 |
| | | | 726/25 |

(Continued)

OTHER PUBLICATIONS

HyunChul Joh et al., "Defining and Assessing Quantitative Security Risk Measures Using Vulnerability Lifecycle and CVSS Metrics," Int Conf. Security and Management, SAM'11. pp. 1-16.*

(Continued)

*Primary Examiner* — Luu Pham
*Assistant Examiner* — Canh Le
(74) *Attorney, Agent, or Firm* — Robert C. Kowert; Meyertons, Hood, Kivlin, Kowert & Goetzel, P.C.

(57) ABSTRACT

A vulnerability records manager (VRM) receives respective vulnerability data sets (VDS) from a first and second vulnerability information collector. Each VDS comprises values of a different set of attributes defined in a vulnerability taxonomy specification. The VRM normalizes the VDSs to generate a first and second vulnerability record comprising a particular plurality of attributes defined in the specification, and stores the vulnerability records in a repository. In response to a request received via a programmatic interface, the VRM transmits contents of the vulnerability records to an automated risk analyzer or a reporting/presentation component.

20 Claims, 9 Drawing Sheets

(56) References Cited

U.S. PATENT DOCUMENTS

| | | | | |
|---|---|---|---|---|
| 2008/0189788 | A1* | 8/2008 | Bahl | G06F 21/577 726/25 |
| 2009/0100017 | A1* | 4/2009 | Graves | G06Q 40/02 |
| 2013/0247207 | A1* | 9/2013 | Hugard, IV | G06F 21/577 726/25 |
| 2014/0137228 | A1 | 5/2014 | Shema et al. | |
| 2014/0137257 | A1* | 5/2014 | Martinez | H04L 63/1433 726/25 |
| 2015/0128274 | A1* | 5/2015 | Giokas | H04L 63/1416 726/23 |
| 2015/0213272 | A1* | 7/2015 | Shezaf | H04L 63/1433 726/25 |

OTHER PUBLICATIONS

Awad A. Younis et al., "Using Attack Surface Entry Points and Reachability Analysis to Assess the Risk of Software Vulnerability Exploitability," IEEE Computer Society, 2014, pp. 1-8.*

"USCERT Federal Incident Notification Guidelines," downloaded Jan. 30, 2015 from https://www.uscert.gov/incidentnotificationguidelines, pp. 1-6.

Information Security-Guide for Applying the Risk Management Framework to Federal Information Systems, National Institute of Standards and Technology, U.S. Dept of Commerce, Feb. 2010, Special Publication 800-37, pp. 1-93.

"Vulnerabilities," downloaded Jan. 30, 2015 from http://www.securityfocus.com/, 2010 copyright SecurityFocus, pp. 1-2.

"OVAL Open Vulnerability and Assessment Language," AVAL, downloaded Jan. 30, 2015 from http://oval.mitre.org/ pp. 1-2.

"Orthogonal Defect Classification," IBM, downloaded Jan. 30, 2015 from http://researcher.watson.ibm.com/researcher/view_group.php?id=480, 1 page.

"NVD Data Feeds," downloaded Jan. 30, 2015 from http://nvd.nist.gov/download.cfm, pp. 1-3.

"Common Vulnerabilities and Exposures—CVE List Main Page," CVE, downloaded Jan. 30, 2015 from https://cve.mitre.org/cve/, 1 page.

Karen Mercedes Goertzel, et al., "Software Security Assurance: State-of-the-Art Report", IATAC, Jul. 31, 2007, pp. 1-367.

Stephen R. Band, Ph.D., et al., "Comparing Insider IT Sabotage and Espionage: A Model-Base Analysis", Software Engineering Institute, Dec. 2006, pp. 1-92.

Dawn Cappelli, et al., "Common Sense Guide to Prevention and Detection of Insider Threats" Software Engineering Institute, Jan. 2009, pp. 1-88, 3rd Edition, Version 3.1.

FL Greitzer, et al, "Identifying at-Risk Employees: A Behavioral Model for Predicting Potential Insider Threats", US Department of Energy, Sep. 30, 2010, pp. 1-46.

Michelle Keeney, J.D., Ph.D, et al., "Insider Threat Study: Computer System Sabotage in Critical Infrastructure Sectors", U.S Secret Service and CERT Coordination Center/SEI, May 2005, pp. 1-45.

Marisa Reddy Randazzo, Ph.D., et al., "Insider Threat study: Illicit Cyber Activity in the Banking and Finance Sector", U.S. Secret Service and CERT® Coordination Center, Aug. 2004, pp. 1-24.

Dr. Bruce Gabrielson, "Insider Threat Workshop" Griffis Institute, Aug. 15, 2013, pp. 1-11.

U.S. Appl. No. 14/697,523, filed Apr. 27, 2015, Stephen George Fridakis.

U.S. Appl. No. 15/608,478, filed May 30, 2017, Vineet Shashikant Chaoji et al.

* cited by examiner

US 10,140,453 B1

VULNERABILITY MANAGEMENT USING TAXONOMY-BASED NORMALIZATION

BACKGROUND

In recent years, more and more computing applications are being implemented in distributed environments. A given distributed application may, for example, utilize numerous physical and/or virtualized servers spread among several data centers of a provider network, and may serve customers in many different geographical locations. A large corporation or government entity may utilize the resources of one or more cloud infrastructure providers for many different applications, with at least some of the applications interacting with each other and with other applications being run on customer-owned premises. Many such applications may deal with highly confidential data, such as financial records, health-related records, intellectual property artifacts, and the like.

As evidenced by the increasing number of recent news reports regarding successful network-based attacks on various businesses, the need for better approaches towards preventing the theft or misuse of business-critical or confidential data continues to grow. Some existing techniques, such as the deployment of virus-scanning software on an enterprise's computer systems, or the enforcement of requirements for non-trivial passwords, address small partitions of the data security problem space. However, especially in environments in which complex applications are run in virtualization-based cloud environments, many application owners may be unaware of all the types of vulnerabilities that may apply to their applications. The virtualization approach, in which the users of a given service are typically not provided with details regarding the specific hardware/software devices being used on their behalf, and are typically not provided administrative privileges for those devices, may simplify the use of the service considerably from the perspective of the average user. However, from the perspective of the individuals responsible for information security at an enterprise that utilizes cloud-based infrastructure, virtualization environments may present significant challenges. In some cloud environments, the number of different inter-related services and corresponding physical and virtual resources deployed for a given set of customer applications may be so high that vulnerability analysis using existing point solutions may no longer suffice.

Figure 1:
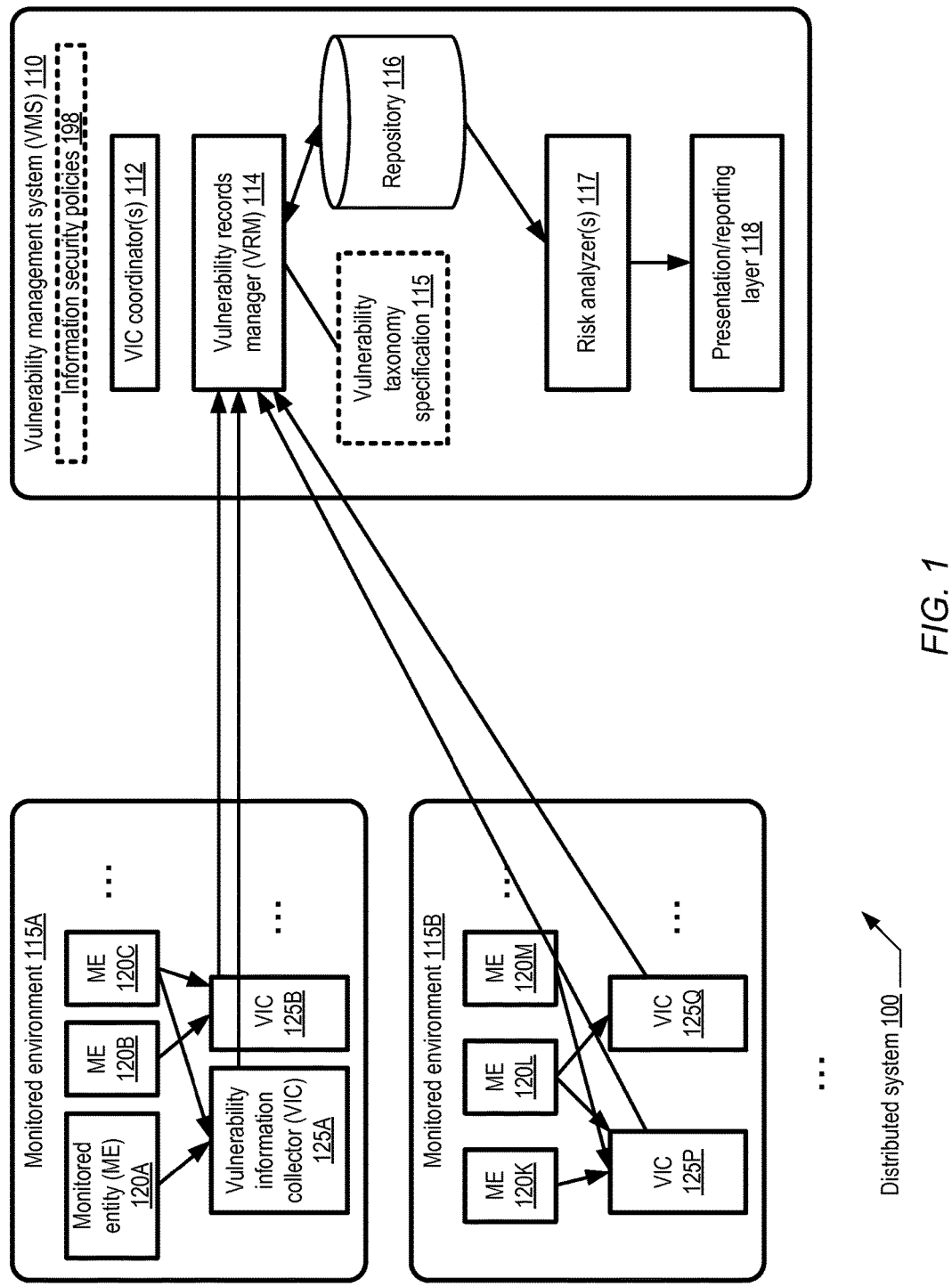
FIG. 1 illustrates example high-level components of a vulnerability management system (VMS) established to implement information security policies associated with one or more computing environments, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing information security policies using a unified taxonomy for vulnerability data are described. The taxonomy may be defined in such a way that a wide variety of vulnerability-related data types applicable to complex collections of applications and resources in distributed environments (including cloud-based computing environments) may be expressed in a standardized or normalized format. The collection of attributes defined in the taxonomy in some embodiments may be comprehensive enough to capture vulnerability information at diverse granularity levels—e.g., at the application architecture level, the hardware/software configuration level, the environment variable level, and so on. In at least some embodiments the taxonomy may also include attributes that can be used to refer to external pre-existing vulnerability databases, such as may be maintained and published by various security management companies, government entities, or standards organizations.

Vulnerability data sets may be extracted from a number of different categories of hardware and/or software components by a large collection of vulnerability information collectors (VICs) (e.g., virus scanners, network port vulnerability checkers, configuration checkers, and the like) in various embodiments. At least some of the VICs may comprise automated sensors in some implementations. In some embodiments, different classes of VICs may be configured to operate independently and asynchronously with respect to one another, and may collect respective sets of vulnerability-related data according to VIC-specific schedules (and/or in response to a detection of a triggering condition). The collected data may be transmitted from a given VIC, e.g., in a native format that may differ from the formats used at other types of VICs, to a vulnerability records manager (VRM) responsible for storing records corresponding to the VIC submissions. In some embodiments, certain types of VICs may send raw data without much pre-processing to the VRM, while other types of VICs may perform at least some level of analysis before transmitting the vulnerability data. The VRM may normalize the received data into a standard form and store respective vulnerability records for various VIC submissions in a persistent storage repository in some embodiments. In at least some embodiments, the taxonomy used for normalizing the vulnerability data may define a large set of attributes, and not all the VICs may be configured to collect data that can be used to fill out all the attributes defined in the taxonomy. The VRM may be responsible in such embodiments not only for receiving the vulnerability data sets from VICs, but also for determining values (e.g., based on contextual information such as the network addresses of the VICs) to be stored for one or more attributes defined in the taxonomy.

In at least some embodiments, the VRM may be implemented as part of a larger vulnerability management system (VMS) established to implement information security policies for a distributed computing environment. In addition to the VRM, the VMS may comprise, for example, a set of one or more risk analyzers, as well as a reporting/presentation layer. The risk analyzers may examine the contents of the taxonomy-based vulnerability records stored by the VRM, and classify identified vulnerabilities based on an evolving rule set in various embodiments. The uniformity or homogeneity of the structure of the stored vulnerability records (imposed to comply with the taxonomy) may enable the risk analyzers to identify correlations and causal chains that may otherwise have been hard to detect. The reporting/presentation layer may provide users of the VMS with prioritized summaries of the vulnerabilities and/or responses recommended by the risk analyzers, and such summaries may then be used to take remedial actions. In at least some embodiments, the VMS may also comprise modules that are responsible for initiating immediate corrective actions (e.g., shutting down a set of web servers at which packets suspected of being part of a denial-of-service attack have been identified) to certain types of vulnerabilities. In one embodiment, the VMS may include one or more VIC coordinators or controllers, responsible for establishing and/or maintaining at least some of the VICS from which vulnerability data sets are collected.

Figure 2:
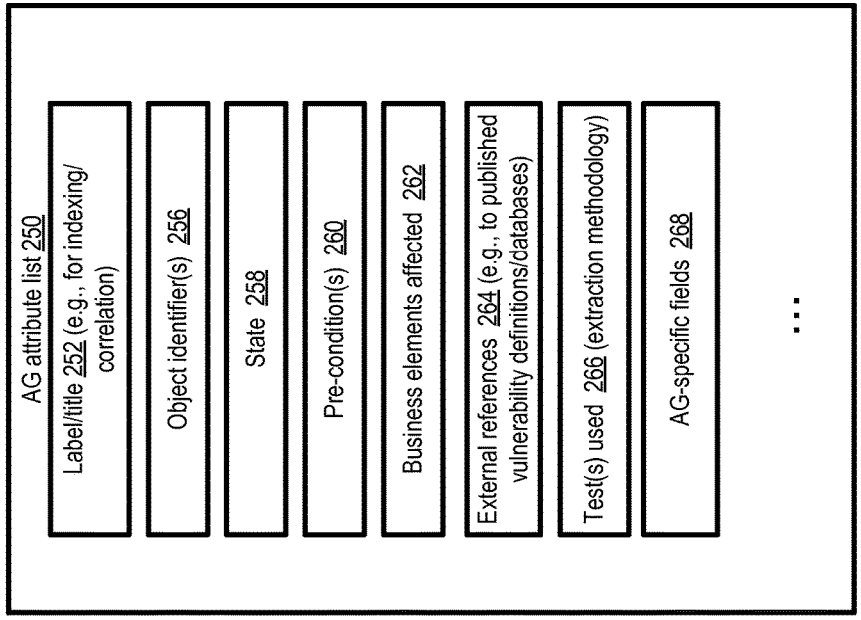
FIG. 2 illustrates example elements of a vulnerability taxonomy specification that may be utilized at a vulnerability management system, according to at least some embodiments.
Figure 2:
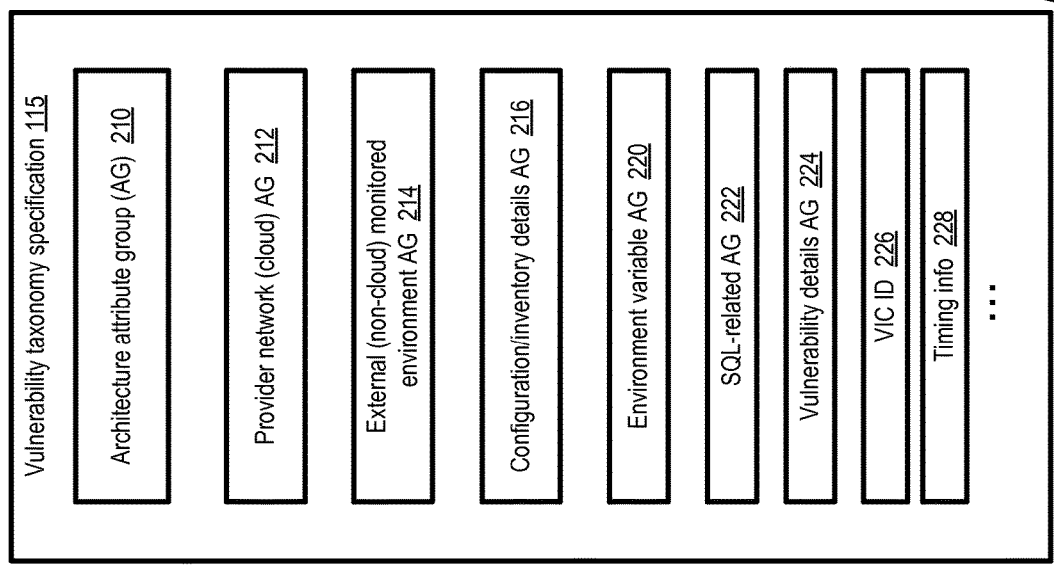

As mentioned above, a wide variety of attributes may be defined in the vulnerability taxonomy in some embodiments. In one embodiment, the attributes of the taxonomy may be organized in a plurality of groups for different sets of related characteristics. One group may comprise architecture-related attributes (e.g., for information indicative of the high-level goals for which the entities being monitored for vulnerabilities are configured, such as "electronic commerce 3-tier application"), another may comprise network environment attributes (e.g., if the vulnerability data was collected from a provider network, the name of the provider network operating entity, the cloud services being used, etc.), and so on. Examples of such attribute groups are illustrated in FIG. 2 and described below in further detail.

Instances of several categories of VICs may be used for obtaining the vulnerability data in different environments. For example, some combination of malicious software detectors, hardware/software configuration checkers, database vulnerability checkers, log analysis tools, performance trend detectors, identity and access management tools, network port vulnerability detectors, and the like may be used in one embodiment. The techniques used by the VICs to obtain vulnerability data sets may include, for example, examining contents of file systems, examining contents of main memories, network-based penetration tests, simulated denial of service attacks, identity masquerading attempts, analysis of log file entries, or analysis of performance metrics. Numerous instances of each such VIC category may be deployed to monitor hundreds or thousands of individual hardware and software entities and operations in some embodiments. In some implementations, one or more pre-existing tools that have already been deployed for other purposes in the computing environments being targeted for information security (e.g., tools for measuring and balancing workloads, or logs for tracking events for which billing data is to be generated) may be re-used as VICs. Other VICs may be established or instantiated solely or primarily for the VMS. The frequencies or intervals at which the data is collected may vary for different VICs as well. In at least one embodiment, the VMS may collect behavioral data as well (e.g., as opposed to strictly technical data dealing with computing devices alone), indicative for example of unusual patterns of employee behavior at the businesses or organizations for which vulnerability analysis is being performed. In one embodiment, some VICs may include physical security devices at various data centers or offices, e.g., output from security cameras, employee identity card scanners, and the like may be included in or referred to within vulnerability records stored by the VRM.

Example System Environment

FIG. 1 illustrates example high-level components of a vulnerability management system (VMS) established to implement information security policies associated with one or more computing environments, according to at least some embodiments. As shown, distributed system 100 comprises a plurality of monitored environments 115, such as 115A and 115B, each of which may include a plurality of monitored entities 120. For example, monitored environment 115A includes monitored entities 120A, 120B and 120C, while monitored environment 115B includes monitored entities 120K, 120L and 120M. Each monitored entity 120 may in turn comprise, for example, a set of hardware and/or software objects that are used for one or more applications of a customer of the VMS.

A plurality of vulnerability information collectors (VICs) 125 may be instantiated for or assigned to the monitored entities 120 in each environment 115. For example, for the monitored entities of environment 115A, VICs 125A and VICs 125B may be set up, while for the monitored entities of environment 115B, VICs 125P and 125Q may be established. Each VIC 125 may utilize one or more extraction strategies to obtain a vulnerability data set from one or more monitored entities in the depicted embodiments. The extraction techniques may include, for example, examining contents of one or more file systems, examining contents of one or more main memories, network-based penetration tests, simulating denial of service attacks, identity masquerading attempts, analysis of a set of log file entries, or analysis of a set of performance metrics. A given VIC 125 may obtain vulnerability data from multiple monitored entities in some cases, such as VIC 125A, which collects data from MEs 120A and 120C. Similarly, a given monitored entity may be a source of vulnerability data to two or more VICs—e.g., ME 120C is a source for VIC 125A as well as VIC 125B, and ME 120L is a source for both VIC 125P and VIC 125Q in the depicted embodiment. Different VICs may, for example, extract vulnerability data about respective distinct aspects or subsystems of a given monitored entity—e.g., in one scenario in which a computer host is the ME, one VIC may comprise a malicious software detector that periodically scans the file systems of the host, while a second VIC may comprise a network port checker that periodically attempts to check whether any network ports of the host are configured to accept packets without performing the appropriate security checks.

In the depicted embodiment, one or more of the computing environments 115 may include at least some resources of a provider network. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. At least some of the services may rely on virtualization in some embodiments—e.g., virtual machines may be used as the units of computing assigned to clients of a computing service, and virtualized software objects may be provided to clients of a storage service. Some of the monitored entities 120 may thus comprise virtualized objects in various embodiments, while other monitored entities may comprise physical or non-virtualized objects (such as the physical hosts at which virtual machines are instantiated, or the physical storage devices at which contents of virtual storage objects are stored). Some computing environments 115 may include devices located at customer-owned premises. A combination of provider network and customer premise resources may be utilized by some customers, and vulnerability analysis may therefore also have to be performed for such hybrid environments.

The VMS 110 may be responsible for implementing or enforcing one or more information security policies 198 in the depicted embodiment. A variety of information security policies 198 may be used in different environments—e.g., policies that specify rules for password contents, policies that specify restrictions on inbound and/or outbound traffic for specific subsets of the monitored entities, policies that indicate the criteria that various users or groups have to meet in order to be granted access to various data sets, policies governing the types of vulnerability data that is to be collected and analyzed, and so on.

In some embodiments, the VMS 110 may include one or more VIC coordinators 112, which may ensure that the appropriate types of VICs are configured to obtain the vulnerability data sets that can be examined to determine whether the information security policies 198 are being complied with or not. In some embodiments, one or more individual VIC categories (e.g., virus scanners, network port vulnerability detectors, and the like) may have their own VIC coordinator, since the logic required to instantiate and maintain VIC fleets of the different categories may be sufficiently different that a single VIC coordinator may not be practical.

A vulnerability records manager (VRM) 114 may receive vulnerability data from the different VICs 125, e.g., either via direct communications or via one or more front-end intermediaries which may be configured for load balancing purposes. Each set of vulnerability data received may comprise values that correspond to some subset (or in some cases, all) of the attributes defined in vulnerability taxonomy specification 115 in the depicted embodiment. Different VICs may submit vulnerability data sets in respective formats—for example, some VICs may provide raw text or numerical data, other VICs may provide data formatted in HTML or in XML, and so on. The VRM may normalize the different data sets, placing them in a common form corresponding to the taxonomy, and store the normalized/standardized data in one or more vulnerability record repositories 116 in the depicted embodiment. When normalizing the data received from the VICs, in some embodiments the VRM may have to fill in some attribute values that were not explicitly provided by the VICs. For example, a given VIC may operate at a low level in the software/hardware stack being used for an application, so that the data collected by that VIC may not necessarily identify the application. However, based on contextual information (e.g., the Internet Protocol (IP) addresses or names of the monitored entities) and/or based on correlating information from other VICs, the VRM may be able to deduce the identity of the application associated with the data collected by the VIC, and store the application identity in the corresponding normalized vulnerability record. In one embodiment, at least some VRMs may be configured to store only the information explicitly provided by the VICs (after re-formatting if required) without adding any deduced attribute values.

The normalized vulnerability records stored in repositories 116 may be accessed by one or more automated risk analyzers 117 of the VMS in the depicted embodiment. Risk analyzers may examine a plurality of vulnerability records to, for example, assign relative priorities to identified vulnerabilities, estimate the associated risks to the customer on whose behalf the VMS is being employed, perform at least an initial phase of causal analysis, and/or suggest remedial actions. The presentation/reporting layer 118 may produce summarized versions of the findings of the risk analyzers for the customer and/or the provider network operator whose resources form part of the monitored environments in some embodiments. The presentation/reporting layer components may also provide various programmatic interfaces (such as web-based consoles, graphical user interfaces and the like) which can be used by authorized personnel to examine or query the output of the risk analyzers (and/or the vulnerability records stored in repository 116) in some embodiments. It is noted that in some embodiments, a VRM may perform some level of risk analysis (especially in response to vulnerability data sets that may require immediate responses) and/or reporting/presentation functions as well. Using the taxonomy specification 115 to provide a harmonized view of vulnerability data, and the combination of the other components of the VMS and VICs shown in FIG. 1, it may become easier for owners of complex application stacks to enforce the information security policies of their choice.

Vulnerability Taxonomy

FIG. 2 illustrates example elements of a vulnerability taxonomy specification that may be utilized at a vulnerability management system, according to at least some embodiments. As mentioned earlier, the specification may define a plurality of attribute groups (AGs) in some embodiments, with each group comprising one or more specific attributes that collectively represent a respective dimension or granularity of vulnerability-related information. As shown, in at least some embodiments, the AGs of the taxonomy specification may include an architecture AG 210, a provider or cloud provider network AG 212, an external monitored environment AG 214, a configuration/inventory AG 216, an environment variable AG 220, an SQL-related AG 222, and a vulnerability details AG 224. In addition to the attribute groups, in some embodiments the specification may also include fields for standardized VIC identifiers 226 and/or for standardized timing information 228 (e.g., comprising one or more timestamps expressed in the same format, indicative of when the collection of the vulnerability data was initiated and/or completed).

Some or all of the AGs in turn may comprise a plurality of attributes similar to attribute list 250 in the depicted embodiment. An attribute list 250 may, for example, include a label or title 252 (which may be useful for indexing and/or correlating different vulnerability records), a set of one or more object identifiers 256 at the appropriate granularity (e.g., subnet name, isolated virtual network identifier, machine name, IP address, module name, and the like), state information 258 (e.g., "running", "paused", "terminated", "failed", etc.), a set of pre-conditions 260 for obtaining the observed vulnerability data set, an indication of the business elements 262 affected by the vulnerability data set, references to external vulnerability databases/definitions 264, tests 266 indicating the extraction methodology used for the vulnerability data set, and zero or more AG-specific fields 268 (i.e., fields which differ from one AG to another). In at least some embodiments, if re-extracting the vulnerability data set is possible, the tests 266 may comprise a set of machine-readable instructions that can be re-run to obtain the vulnerability data. In some cases (e.g., when timing-dependent, hard-to-reproduce information is collected by the VICs), it may not be straightforward to re-extract the vulnerability data set, in which case the extraction methodology that was used for collecting the original vulnerability data may be indicated in test attributes 266.

The architecture-level AG 210 may include information at the highest/broadest granularity in the depicted embodiment: for example, indicative of the application set or resource set of a particular client on whose behalf the vulnerability management system is being deployed. Some customers' application sets may utilize resources only within a provider network; other customers may use a combination of provider network resources and customer-premise resources, while yet other customers may prefer to utilize the VMS for customer-premise-only applications. To accommodate all these different scenarios, the taxonomy of FIG. 2 may include provider network AG 212 (in which, for example, the identity of the provider network operator may be indicated, the services being used by the customer's applications may be indicated, and so on) as well as external environment AG 214 (which may include information regarding the customer-premise portions of the monitored environment). Configuration/inventory details AG 216 may indicate, for example, a key to a configuration database record at which a monitored entity's configuration information is stored, a name assigned to a monitored entity, and so on. Environment variables that are relevant to the vulnerability data set, such as tunable parameter settings and the like, may be indicated in AG 220. SQL-related information (if any) such as the query or queries evaluated to obtain the vulnerability data may be indicated in AG 222. The vulnerability details AG 224 may include, for example, the name of the specific tool being used to collect the vulnerability data, the version of the tool, the results of running the tool, and references (if any are appropriate) to external vulnerability databases/definitions. For example, a reference to a database published by a government agency, a security-related consortium, or a security industry business entity may be included. It is noted that not all the AGs shown in FIG. 2 may necessarily be included in the vulnerability taxonomy specification in some embodiments, and that other attribute groups may be included in other embodiments. Furthermore, not all the attributes shown in AG attribute list 250 may be included in all the attribute groups in one embodiment, and additional attributes may be included for at least some AGs in some embodiments. In at least some embodiments, not all the attributes of the taxonomy need be populated in any given vulnerability record; for example, null values may be permitted for at least a subset of attributes of one or more attribute groups.

In some embodiments, the taxonomy specification may be designed to comply with, or be compatible with, various security-related standards, each of which may typically apply to a few specific categories of monitored entities. For example, government bodies (such as the National Institute of Standards and Technology (NIST) in the United States) may define and publish various standards regarding cybersecurity and the like, and the taxonomy specification used by the VMS may take at least some such standards into account. Other organizations such as industry consortia or specific security companies may define standards associated with application or systems security, and the VMS taxonomy specification may utilize, refer to, or be compatible with such standards as well. In various embodiments, the VMS may utilize widely-available approaches towards representing vulnerability-related information (e.g., popular open source or community-developed languages may be used for storing some of the kinds of attributes discussed above).

VRM Component Distribution

In one embodiment, a provider network at which at least a portion of a vulnerability management system is implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some embodiments, a hierarchy of VMS components may be set up within a provider network, e.g., corresponding to the geographical hierarchy of regions, availability containers and data centers.

Figure 3:
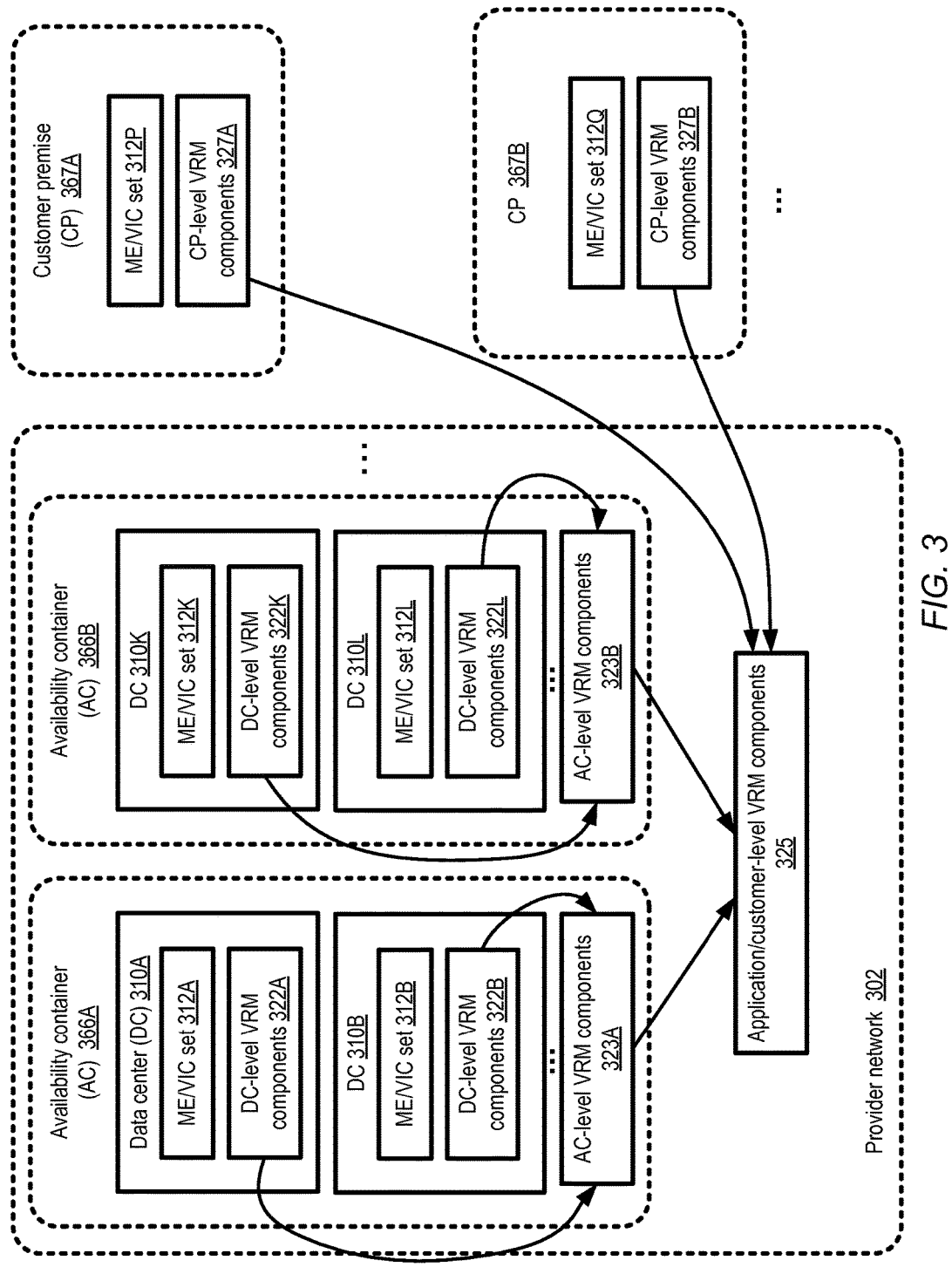
FIG. 3 illustrates an example of a multi-level hierarchy of vulnerability record management components that may be implemented in a provider network environment, according to at least some embodiments.

FIG. 3 illustrates an example of a multi-level hierarchy of vulnerability record management components that may be implemented in a provider network environment, according to at least some embodiments. In the depicted embodiment, provider network 302 comprises a plurality of availability containers (ACs), such as AC 366A and 366B. A customer of the provider network may also use resources housed in external locations for at least a subset of the applications for which the VMS is to be used, such as customer premise 367A and customer premise 367B. In the depicted embodiment, availability containers 366A and 366B may each comprise a plurality of data centers, such as data centers 310A and 310B in AC 366A, and data centers 310K and 310L in AC 366B. Each data center may comprise its set of monitored entries and the corresponding set of VICs, indicated by the blocks labeled "ME/VIC set" in FIG. 3. DC 310A includes ME/VIC set 312A, DC 310B includes ME/VIC set 312B, DC 310K includes ME/VIC set 312K and DC 310L includes ME/VIC set 312L. Each ME/VIC set may comprise different numbers and types of monitored entities, and the number of VICs instantiated at each data center may differ from the number instantiated at other data centers.

To handle the vulnerability data collected locally within each data center, respective DC-level vulnerability record manager (VRM) components 322 may be set up. For example, DC-level VRM components 322A, 322B, 322K and 322L may be established in DCs 310A, 310B, 310K and 310L respectively. One or more respective local repositories may be set up for the vulnerability records collected at each data center, for example.

Depending on various factors such as the number of MEs, the number of VICs, the frequency at which vulnerability data is collected, and so on, the volume of vulnerability records generated at any given data center may be quite high (for example, millions of vulnerability records may be generated per day). At the next higher level of the VRM component hierarchy, AC-level VRM components such as 323A and 323B may be established in the depicted embodiment. Aggregated versions or filtered/prioritized subsets of the vulnerability records collected at the DC level may be transmitted to the AC-level VRM components 323 in the depicted embodiment.

At each external location at which resources are consumed for the customer's application set, such as customer premise 367A or 367B, a respective set of VRM components 327 (such as CP-level VRM components 327A or 327B) may also be instantiated in the depicted embodiment. Each CP-level component may include its own repository as well as a local instance of the modules responsible for normalizing and storing vulnerability data collected from ME/VIC sets such as 312P or 312Q. From the various AC-level and CP level VRM components, filtered/aggregated representations of vulnerability records may be transmitted to the next higher level of the VRM hierarchy in the depicted embodiment: application or customer level VRM components 325. In at least one embodiment, secure communication channels may be established between the CP-level VRM components and the higher-level VRM components within the provider network. For example, in some implementations VPN (Virtual Private Network) connections may be used, while in other implementations dedicated physical links (sometimes referred to as "Direct Connect" links) may be used. In some embodiments, one or more risk analyzers of the VRM may operate at the application/customer level, as vulnerability information from all the resources involved in a customer's applications may be available. In other embodiments, at least some level of risk analysis and/or initiation of remedial actions may be performed at lower levels of the hierarchy as well. In some embodiments, some or all of the application/customer level VRM components may be instantiated at a customer premise instead of within the provider network. In one embodiment, a given customer's application stack may use resources at multiple provider networks, in which case another layer of VRM components (e.g., above the AC layer and below the application/customer layer) may be used to combine the vulnerability information collected from the different provider networks.

Figure 4:
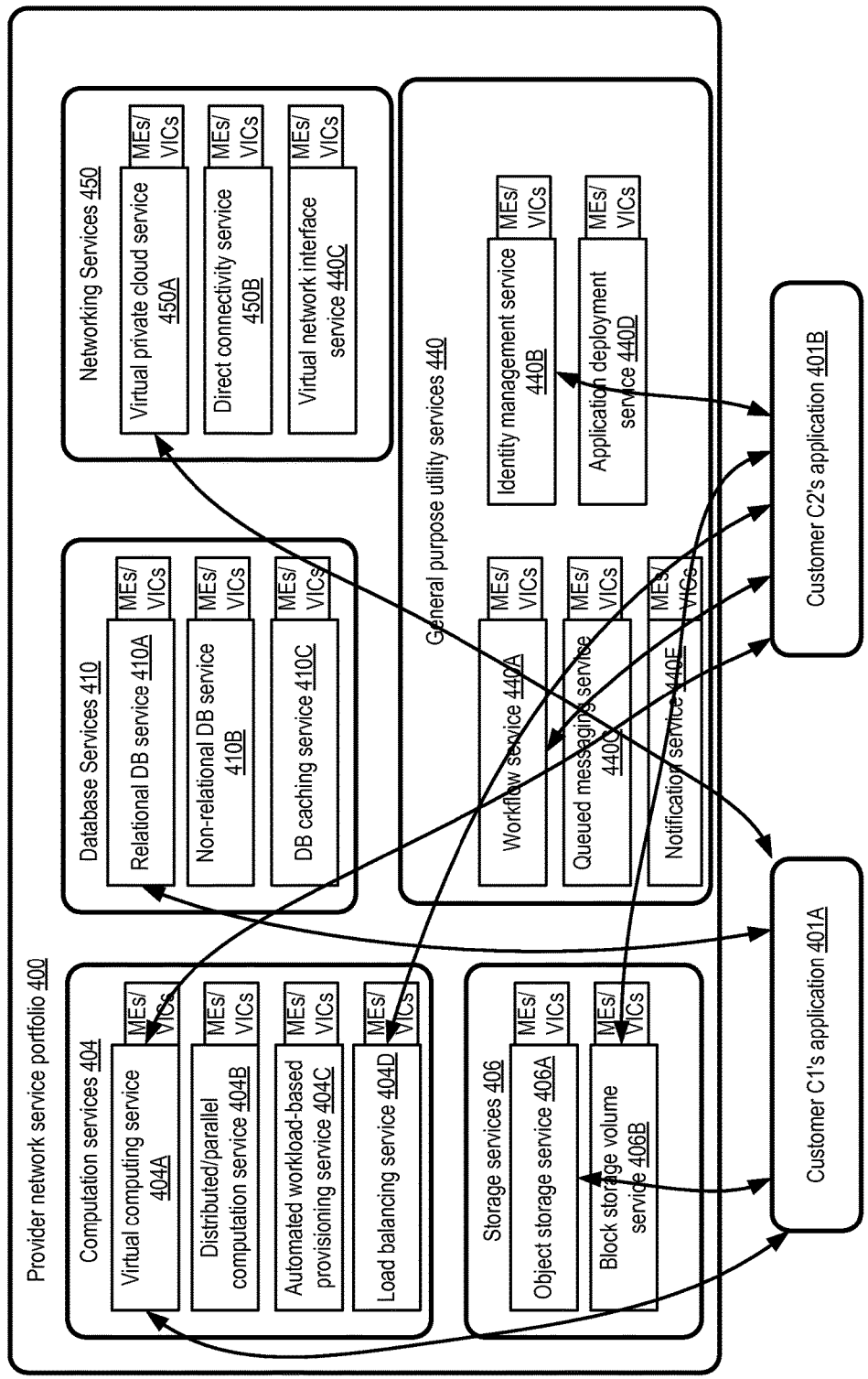
FIG. 4 illustrates examples of a plurality of services of a provider network, for some or all of which respective sets of vulnerability information collectors may be configured, according to at least some embodiments.

The entities that are to be monitored for vulnerabilities with respect to a given customer application may be associated with numerous different network-accessible services implemented at a provider network in some embodiments. FIG. 4 illustrates examples of a plurality of services of a provider network, for some or all of which respective sets of vulnerability information collectors may be configured, according to at least some embodiments. In the depicted embodiment, the provider network's service set may include a group of computation services 404, storage services 406, database services 410, networking services 450 and general-purpose utility services 440. Computation services 404 may include, for example, a virtual computing service 404A (e.g., a service from which access to various types of general-purpose virtual machines can be obtained), a distributed/parallel computing service 404B (with specialized hardware/software components designed for high degrees of parallelism), an automated workload-based provisioning service 404C that can be used to gracefully scale up or scale down applications, and a load balancing service 404D to distribute workloads among groups of computational resources.

Several different types of storage-related services may be implemented at some provider networks, such as an object storage service 406A which provides web-services based access to unstructured storage objects, or a volume service 406B which provides block device level access to storage volumes. In some embodiments, a number of different database-related services may be implemented, such as relational database service 410A, non-relational (e.g., "noSQL") database service 410B, or database caching service 410C. Various networking-related services may be supported at the provider network in the depicted embodiment, such as a virtual private cloud service 450A (which can be used to configure isolated virtual networks on behalf of various customers), a direct connectivity service 450B (which allows customers to connect external networks to the provider network via dedicated physical links or "direct connect" links), or a virtual network interface service 450C (which allows logical network interfaces to be programmatically attached to virtual machines, without requiring reconfiguration of physical network interface cards). The general purpose utility service category may include, for example, a workflow service 440A which can be used to implement workflows involving interactions between components of other services, an identity management service 440B for user/group authentication, a queued message service 440C for persistent messaging applications, a deployment service 440D for orchestrating resource deployment for complex applications, and a notification service 440E for scheduling various types of event notifications. Other services may be implemented at a provider network in different embodiments, and some of the types of services illustrated in FIG. 4 may not be implemented.

Each of the services shown in FIG. 4 may be implemented using some set of hardware and/or software resources, with some of the resources being shared by multiple services. A respective set of MEs and VICs may be established for each service in the depicted embodiment to collect vulnerability data specific to the service components. A given customer's application set may utilize any desired combination of the services implemented at the provider network, and vulnerability data may therefore have to be collected from various components being used for those services. As shown, for example, customer C1's application 401A may use virtual computing service 404A, object storage service 406A, relational database service 410A, and virtual private cloud service 450A. In contrast, customer C2's application 401B may utilize the virtual computing service 404A, load balancing service 404D, block storage volume service 406B, workflow service 440A, and identity management service 440B. The vulnerability records managers (not shown in FIG. 4) established on behalf of different customers may therefore have to be able to handle data collected from different combinations of services. The use of a unified taxonomy specification of the kind illustrated in FIG. 2 may make this task easier in some embodiments.

Vulnerability Information Collector Examples

Figure 5:
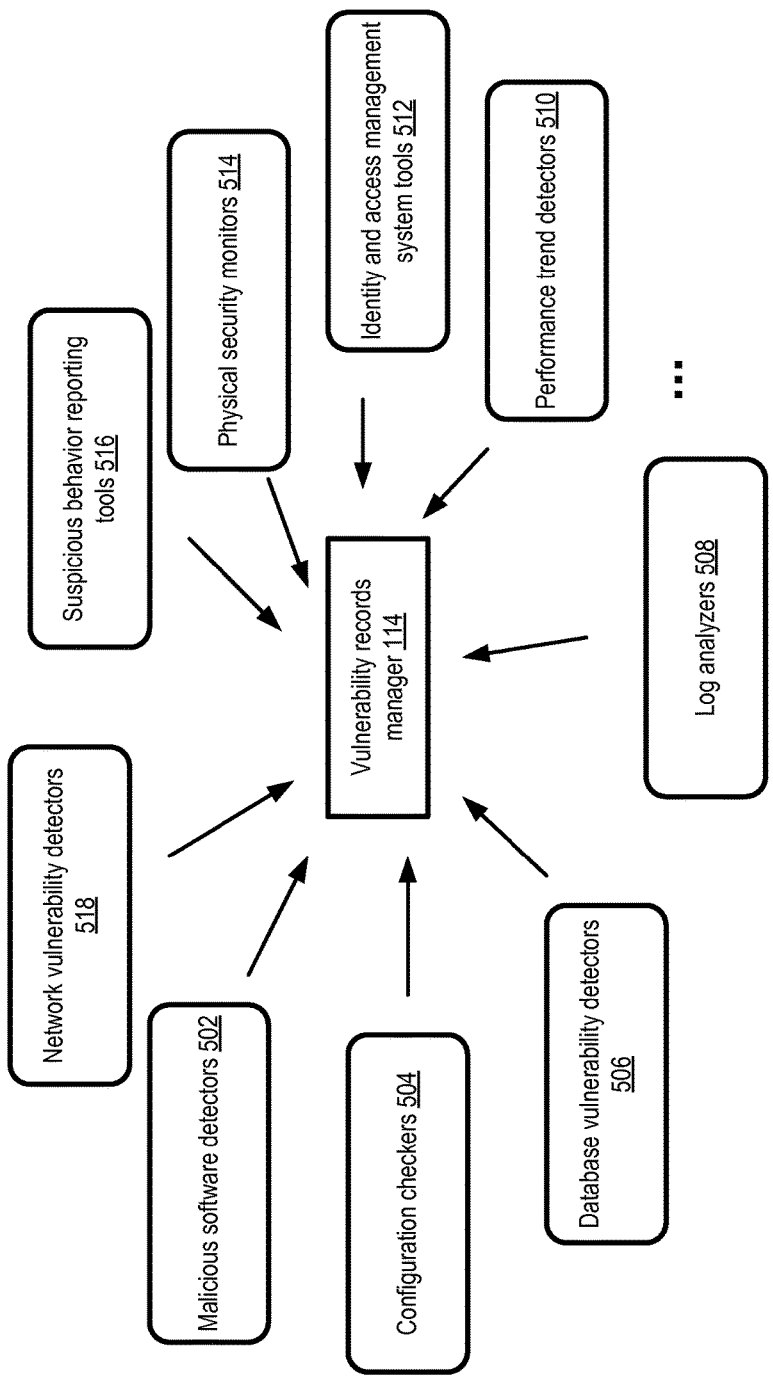
FIG. 5 illustrates examples of the types of vulnerability information collectors from which data may be received at a vulnerability records manager, according to at least some embodiments.

For comprehensive vulnerability management solutions, data may have to be collected from a wide variety of sources. In some embodiments, the VMS may be designed to be agnostic with regards to data sources—e.g., its interfaces (discussed in further detail with respect to FIG. 6) may be designed to accept data from pre-existing tools that may already have been deployed by customers for other purposes, as well as some categories of VICs that may have been implemented specifically for the VMS. FIG. 5 illustrates examples of the types of vulnerability information collectors (VICs) from which data may be received at a vulnerability records manager, according to at least some embodiments. Malicious software detectors 502 (such as virus scanners, Trojan horse detectors, work detectors, and the like) represent a fairly well-known category of VICs, which may be installed locally on various computing platforms inside and outside the provider network. Configuration checkers 504 may comprise a variety of tools that periodically (or on demand) examine the configuration settings of various hardware/software components, and in some cases may compare the detected configurations with acceptable configurations to identify deviations that could represent vulnerabilities. Some configuration checkers may be incorporated within configuration change utilities—e.g., whenever a monitored entity's configuration is changed, an indication of the change may be provided to a VRM.

Database vulnerability detectors 506 (e.g., tools which may attempt to submit unauthorized queries or transaction requests) of various kinds may be deployed as VICs in some embodiments. Log analyzers 508 may represent another broad category of VICs, which may be utilized for logs collected at various layers of the software/hardware stack, including operating system logs, database logs, application logs, and so on. In some embodiments performance metrics may indicate possible vulnerabilities—e.g., if the network traffic rate inbound or outbound of a group of servers drops dramatically below (or climbs very high above) its long-term moving average, this may indicate a potential problem. Accordingly, tools such as trend detectors 510 may be used as VICs in some embodiments.

Identity and access management tools 512, which may for example attempt unauthenticated accesses using masquerading or "spoofing", monitor password quality and password lifetimes, may also serve as sources of vulnerability data sets for VRMs 114 in some embodiments. Network vulnerability detectors 518 may include port scanners (which attempt to access unsecured or poorly secured network ports), denial-of-service (DOS) detectors/simulators, and the like. In some embodiments, physical security monitors such as employee access-card scanners, security video cameras, and the like may be employed as VICs. In at least one embodiment, in addition to collecting technical information, a VRM may also obtain behavior-related information, e.g., via anonymous reporting tools 516 for suspicious behavior (e.g., removal of physical property from customer premises, attempts to access high-security work zones, etc.) observed within an enterprise.

Vulnerability Records Manager Components

Figure 6:
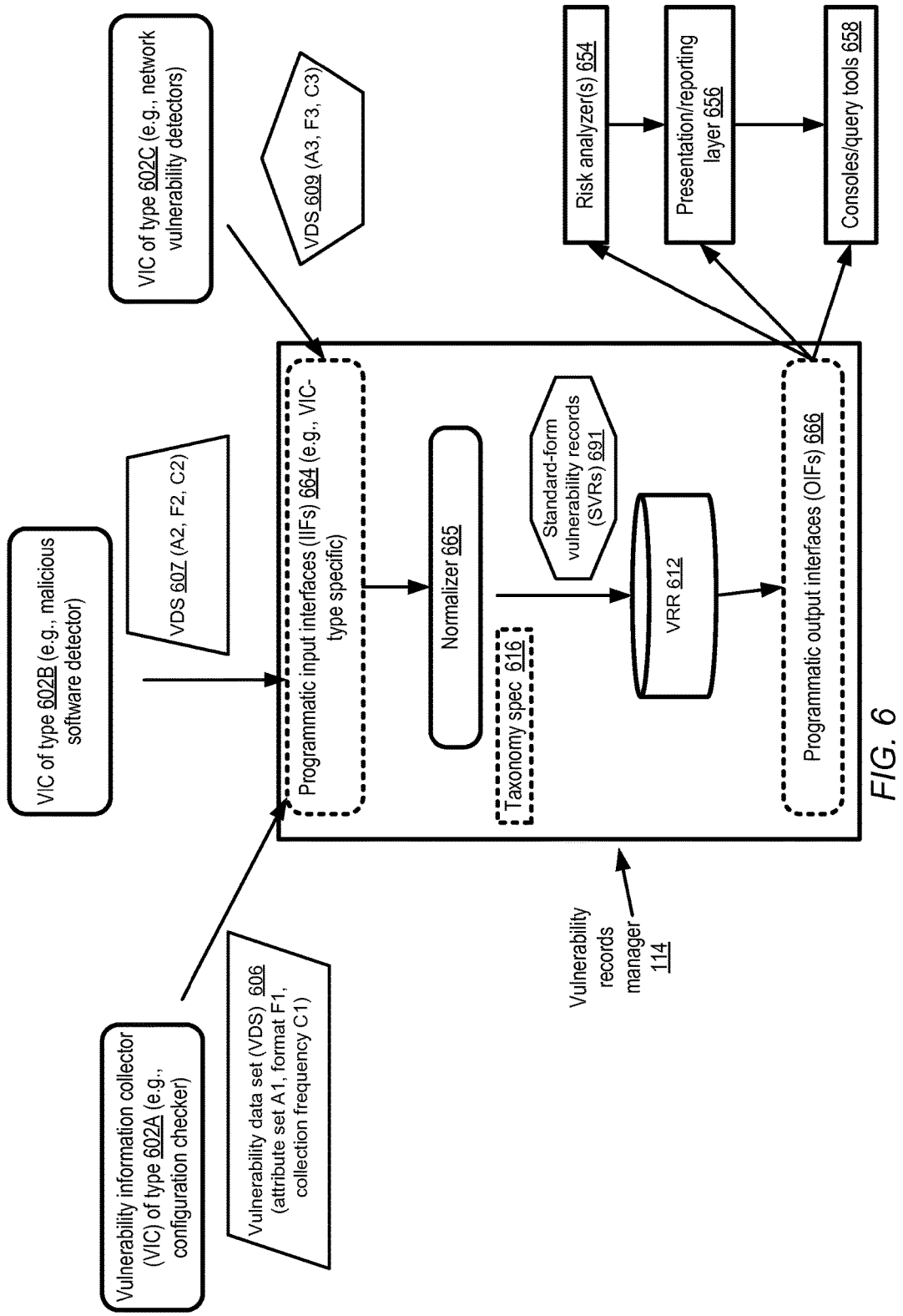
FIG. 6 illustrates subcomponents of a vulnerability records manager, according to at least some embodiments.

FIG. 6 illustrates subcomponents of a vulnerability records manager (VRM), according to at least some embodiments. As shown, the VRM 114 may include a set of programmatic input interfaces (IIFs) 664 designed to accept vulnerability data sets in diverse formats from instances of a variety of VIC types. For example, VICs of type 602A (such as configuration checkers) may transmit vulnerability data sets (VDSs) 606 comprising values for a first set of attributes A1, in a format F1, at some collection frequency C1 to the VRM via one set of IIFs. VICs of a second category 602B (such as malicious software detectors) may submit VDSs 607 comprising values of a different set of attributes A2, in a different format F2, and at a different collection frequency C2. Similarly, VICs of types 602C, such as network vulnerability detectors, may transmit VDSs 608 comprising values of a third combination of attributes A3, in a third format F3 at yet another collection frequency C3. In some cases, different subsets of the IIFs 664 may be used by the respective VIC types.

The VRM may include a normalizer 665 in the depicted embodiment, which reformulates the diverse VDSs received from the VICs into a common, standard form in compliance with the taxonomy specification 616. The standard-form vulnerability records 691 may then be stored in one or more repositories 616 on persistent storage devices. Any of a variety of languages or formatting conventions may be used for storing the SVRs 691 in different embodiments, such as XML (Extensible Markup Language), JSON (JavaScript Object Notation), or the like. In some embodiments, the relational data model or relational data definition languages (DDLs) may be used for the SVRs, with each SVR being stored as a row in a database table. Non-relational formats or DDLs may be used in at least one embodiment. A number of programmatic output interfaces (OIFs) 666 may be supported at the VRM in different embodiments, e.g., to enable access to the SVRs from risk analyzers 654, reporting/presentation layer components 656, and/or directly from consoles/query tools 658. In some embodiments, each of the types of consumers of the SVRs (risk analyzers, reporting/presentation layers, etc.) may utilize different subsets of the OIFs. In at least some embodiments, the IIFs, OIFs, or both may be implemented using an extensible framework, so that new types of VICs and SVR consumers may be accommodated over time with little additional effort.

Figure 7:
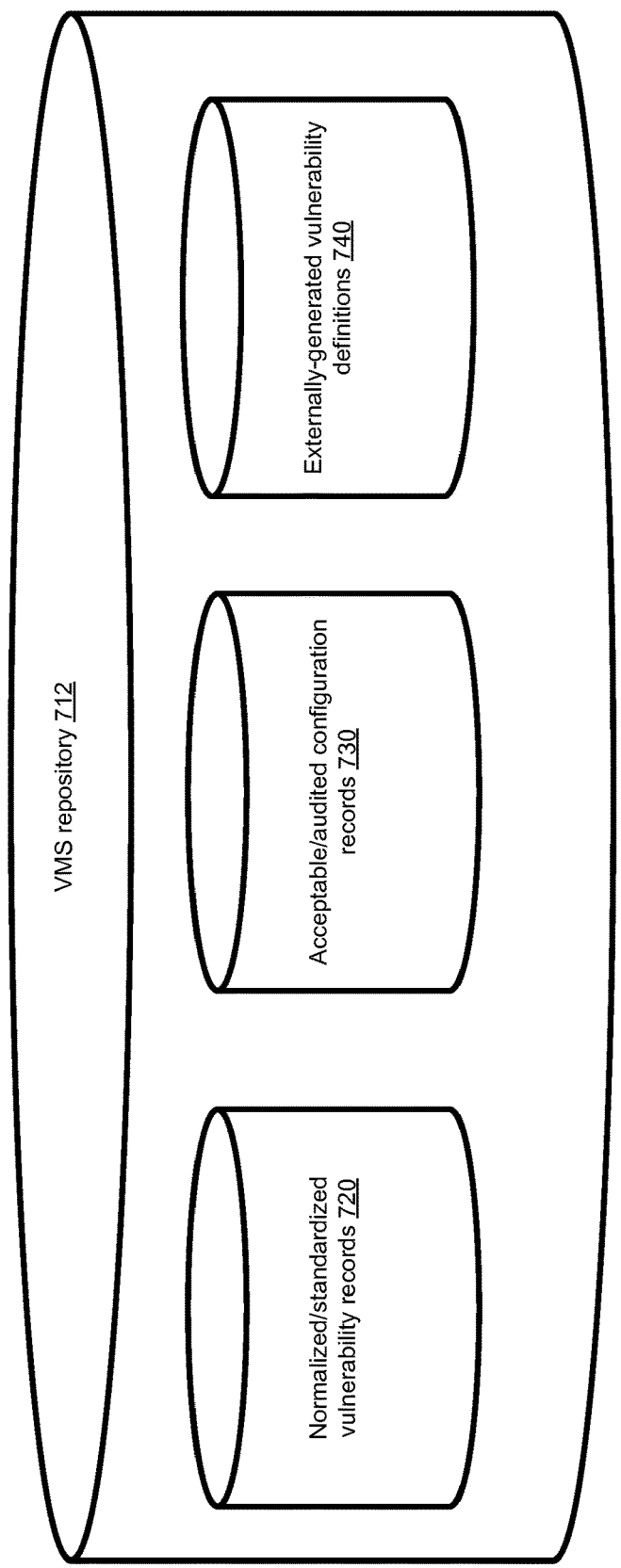
FIG. 7 illustrates examples of the types of records that may be stored in a persistent repository of a vulnerability management system, according to at least some embodiments.

In addition to the vulnerability records themselves, other types of artifacts may be stored at a VMS in some embodiments. FIG. 7 illustrates examples of the types of records that may be stored in a persistent repository of a vulnerability management system, according to at least some embodiments. As shown, VMS repository 712 may be used for standardized/normalized vulnerability records 720, acceptable or audited configuration records 730, and externally-generated vulnerability definitions 740 in the depicted embodiment. The acceptable/audited configuration records may be compared with the output produced by configuration checker VICs in some embodiments to detect deviations or variations that may represent vulnerabilities—e.g., the absence or disabling of a firewall, or the granting of administrator access to large numbers of users/groups. In some embodiments, the input interfaces (IIFs) of the VRM may be used to establish connectivity with one or more trusted authorities providing vulnerability definitions 740 (e.g., virus definitions, newly-identified networking software flaws, and so on), so that the VRM is automatically notified when new vulnerabilities are identified at such trusted authorities. Such definitions may be used to add new tests to those being performed by VICs, or to configure new VICs, for example.

Methods for Vulnerability Record Management

Figure 8:
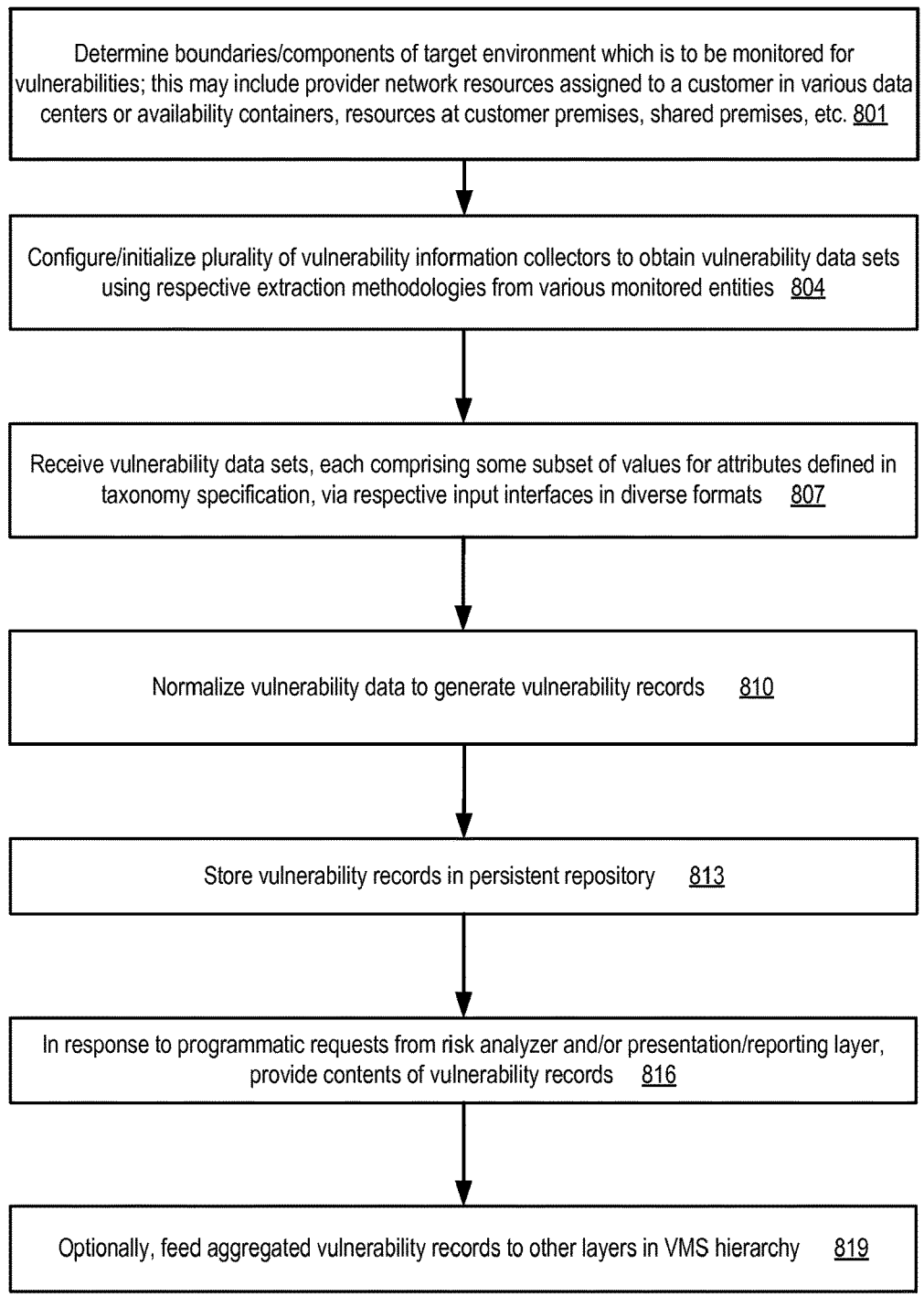
FIG. 8 is a flow diagram illustrating aspects of operations that may be performed to implement information security policies at a distributed computing environment, according to at least some embodiments.

FIG. 8 is a flow diagram illustrating aspects of operations that may be performed to implement information security policies at a distributed computing environment, according to at least some embodiments. As shown in element 801, the boundaries or constituent components of a target environment to be monitored for vulnerabilities using a VMS may be identified. The environment may include a subset of provider network resources (e.g., physical and/or virtual resources used to implement one or more network-accessible services of the kind shown in FIG. 4) that may be assigned to a particular customer or a group of customers. The provider network resources may reside within one or more data centers or availability containers in various embodiments. In some embodiments the target environment may also include resources located outside the provider network, e.g., at various customer-owned premises or at shared premises at which equipment belonging to the provider network and customers is co-located. In scenarios in which vulnerability data is aggregated from locations inside and outside the provider network (or from more than one provider network), secure network connections (e.g., using VPNs, dedicated direct physical links, TLS (Transport Layer Security), SSL (Secure Sockets Layer), or other appropriate techniques) may be established between various components of the VMS.

A number of vulnerability information collectors (VICs) may be configured or established to collect data from the resources of the target environment (element 804). In at least some embodiments, pre-existing tools (such as virus scanners, network port scanners) that are already in use may be used as VICs, e.g., by establishing network connectivity between the tools and one or more vulnerability records collectors. In other embodiments, at least a subset of the VICs may be instantiated specifically for the VMS. VICs may utilize a variety of extraction techniques to collect vulnerability-related data from monitored entities of the target environment, such as examining contents of memory or file systems, running simulated attacks such as firewall penetration tests, examining log entries, and the like. In some cases, a given VIC may be implemented as one or more processes or threads of execution at one or more computing devices which are also being used concurrently for other purposes. In other cases a VIC may comprise a dedicated set of hardware and/or software components, including for example cameras, card scanners, network tapping devices, and so on. The monitored entities may include hardware devices and/or software components in various embodiments. In addition to hardware and software components, in at least one embodiment behavior of employees may also be monitored (e.g., by detecting unusual access patterns of employees, the timing of their entry and exit from premises, and so on). A variety of programmatic interfaces such as anonymized reporting tools may be supported for such behavioral data in some embodiments.

A vulnerability records manager (VRM) may receive respective vulnerability data sets from the different VICs (element 807) in the depicted embodiment. Each type of VIC may provide its own combination of values for various attributes defines in a vulnerability taxonomy specification used by the VRM; thus, the vulnerability data sets received from different classes of VICs may in general be heterogeneous in terms of the subset of taxonomy attributes covered. Some VICs may provide raw data to the VRM, e.g., in the form in which it is first collected from the monitored entities; other VICs may pre-process the raw data and provide the results of the pre-processing to the VRM. A variety of formats may be used by different VICs for their vulnerability data. The VRM may normalize the data sets received from the VICs (element 810), e.g., placing the data into a common format for a common set of attributes defined in the specification, and store the normalized data in the form of respective vulnerability records in one or more persistent repositories (element 813). In at least some embodiments, a corresponding vulnerability record may be stored for each vulnerability data set received from each VIC. In other embodiments, the VRM may analyze and/or aggregate contents of two or more vulnerability data sets to generate a single normalized vulnerability record.

In response to receiving requests via one or more programmatic interfaces, the VRM may provide contents of the vulnerability records to automated risk analyzers and/or presentation/reporting layer components of the VMS (element 816). In some embodiments, e.g., to handle the potentially large volumes of vulnerability data sets that may be collected, a hierarchy of VRM components may be set up as discussed in the context of FIG. 4. In such embodiments, the VRM components at one layer of the hierarchy (e.g., at a given data center) may aggregate and/or filter vulnerability records based on various criteria, and may transfer the aggregated/filtered records to a higher layer of the hierarchy (e.g., at the availability container level or at the application/customer level) (element 819). It is noted that in various embodiments, some of the kinds of operations shown in FIG. 8 may be implemented in a different order than that shown in the figure, or may be performed in parallel (e.g., continuously) rather than sequentially. For example, while some received vulnerability data is being normalized (in operations corresponding to element 810) or stored (element 813), new vulnerability data may continue to be received (element 807), and previously stored normalized records may be provided to the risk analyzers or the presentation/reporting layer (element 816). In some embodiments, some of the operations shown in FIG. 8 may not be implemented, or additional operations not shown in FIG. 8 may be performed Use Cases The techniques described above, of imposing taxonomy-based normalization or standardization on widely varying vulnerability data sets collected for complex application and resource sets may be useful in a variety of scenarios. Some business entities may utilize a number of physical and/or virtual resources distributed inside and outside a provider network to implement applications dealing with sensitive data. While utilizing the provider network resources may make it much easier for the applications to scale, it may be much harder for the information technology (IT) staff of the business entities to manage application security than if the applications were implemented entirely within premises owned by the business. Furthermore, sophisticated applications may utilize so many different services of the provider network that it may be a non-trivial task even to identify all the hardware and/or software components used for the applications, much less to collect and analyze data pertaining to possible violations of security policies in a timely manner. Using standardized vulnerability records that conform to a generalized taxonomy capable of representing all the different kinds of vulnerability data sources pertinent to such applications may result in more timely and more effective responses than would otherwise be feasible.

Illustrative Computer System

In at least some embodiments, a server that implements one or more of the techniques described above for supporting vulnerability management systems, including VRMs (vulnerability records managers), VICs (vulnerability information collectors), risk analyzers and the like may include a general-purpose computer system that includes or is configured to access one or more computer-accessible media.

Figure 9:
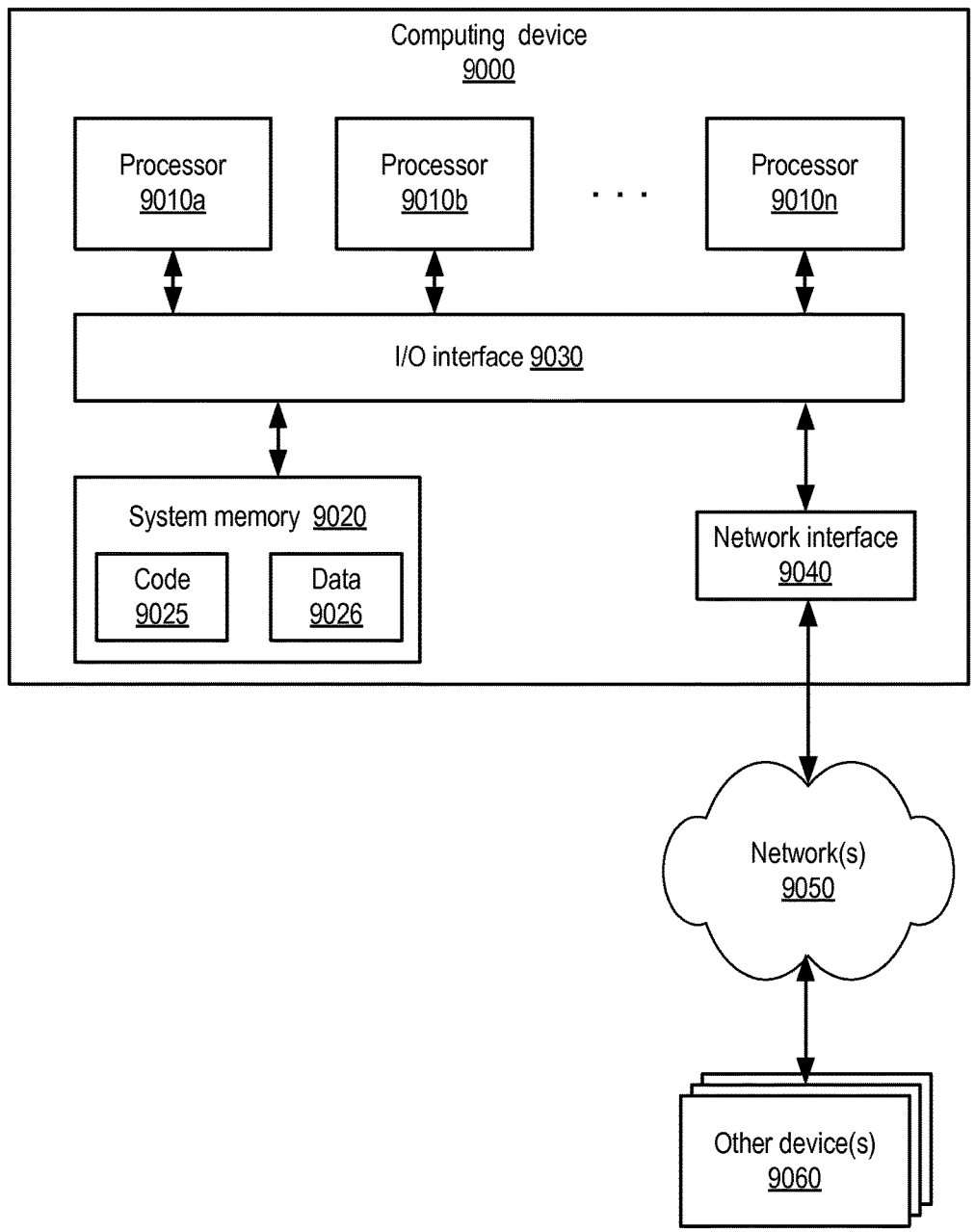
FIG. 9 is a block diagram illustrating an example computing device that may be used in at least some embodiments.

FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed system, comprising:
   a plurality of vulnerability information collectors (VICs) implemented by one or more computing devices comprising one or more hardware processors and memory, including one or more VICs designated for respective groups of monitored entities of a provider network; and
   a vulnerability record manager (VRM) implemented by one or more computing devices comprising one or more hardware processors and memory;
   wherein a first VIC of the plurality of VICs is configured to:
      obtain a first vulnerability data set associated with a first group of one or more monitored entities using a first extraction methodology, wherein the first vulnerability data set comprises values for a first collection of one or more attributes defined in a particular taxonomy specification of the VRM, wherein the particular taxonomy specification includes respective attributes to identify one or more of: (a) a provider network at which a vulnerability data set is collected, (b) a network external to the provider network at which a vulnerability data set is collected, (c) an extraction methodology, or (d) a reference to a vulnerability database, and wherein the first collection of one or more attributes includes an attribute that is not defined according to the particular taxonomy specification;
   wherein a second VIC of the plurality of VICs is configured to:
      obtain a second vulnerability data set associated with a second group of one or more monitored entities using a different extraction methodology, wherein the second vulnerability data set comprises values for a second collection of one or more attributes of the particular taxonomy specification, wherein the second collection comprises at least one attribute which is not present in the first collection;
   and wherein the VRM is configured to:
      receive respective indications of the first and second vulnerability data sets from the first and second VICs;
      normalize the first and second vulnerability data sets into a common format having a common set of attributes defined in the particular taxonomy specification, producing a first vulnerability record corresponding to the first vulnerability data set and a second vulnerability record corresponding to the second vulnerability data set;
      store in a first repository the first vulnerability record corresponding to the first vulnerability data set and the second vulnerability record corresponding to the second vulnerability data set, wherein the first repository is designated for a first level of a monitoring targets hierarchy;
      aggregate the first and second records into a consolidated vulnerability record;
      transmit the consolidated vulnerability record from the first repository to a second repository designated for a second level of the monitoring targets hierarchy; and
      in response to one or more requests received via a programmatic interface, transmit contents of the consolidated vulnerability record to one or more of (a) an automated risk analyzer or (b) a reporting and presentation layer of a vulnerability management system.

2. The system as recited in claim 1, wherein the first VIC comprises one of: (a) a malicious software detector, (b) a configuration checker, (c) a network port scanner, (d) a log analyzer, or (e) a component of an identity management service.

3. The system as recited in claim 1, wherein the first extraction methodology comprises one of: (a) examining contents of one or more file systems, (b) examining contents of one or more main memories, (c) a network-based penetration test, (d) an analysis of a set of log file entries, (e) a simulation of a denial of service attack, (f) an identity masquerading attempt, or (g) an analysis of a set of performance metrics.

4. The system as recited in claim 1, wherein the VRM is configured to:
   store a particular vulnerability record indicative of a behavioral pattern of one or more employees of an organization on behalf of which the VRM is deployed.

5. The system as recited in claim 1, wherein at least one monitored entity of the first group comprises a resource located within the provider network, and wherein at least one monitored entity of the second group comprises a resource located outside the provider network.

6. A method, comprising:
   obtaining, using a first extraction methodology at a first vulnerability information collector (VIC) of a plurality of VICs of a vulnerability management system (VMS), an indication of a first vulnerability data set associated with a first group of one or more monitored entities;
   obtaining, using a different extraction methodology at a second VIC of the plurality of VICs, another indication of a second vulnerability data set associated with a second group of one or more monitored entities;
   normalizing, by a vulnerability records manager (VRM), the first and second vulnerability data sets into a first vulnerability record and a second vulnerability record respectively, wherein the first and second vulnerability records share a common format that includes a common set of attributes defined in a taxonomy specification, and wherein the first vulnerability data set includes one or more attributes that are not in the set of attributes defined in the taxonomy specification;
   storing, at a first repository by the VRM, the first vulnerability record corresponding to the first vulnerability data set and the second vulnerability record corresponding to the second vulnerability data set, wherein the first repository is designated for a first level of a monitoring targets hierarchy;
   aggregating the first and second vulnerability records into a consolidated vulnerability record;
   transmitting the consolidated vulnerability record from the first repository to a second repository designated for a second level of the monitoring targets hierarchy; and
   in response to one or more requests received via a programmatic interface, transmitting, by the VRM, contents of the consolidated vulnerability record to one or more of: (a) an automated risk analyzer or (b) a reporting component of the VMS.

7. The method as recited in claim 6, wherein the taxonomy specification defines respective attributes to identify one or more of: (a) a provider network at which a vulnerability data set is collected, (b) a network external to the provider network at which a vulnerability data set is collected, (c) an extraction methodology used for a vulnerability data set, or (d) references to vulnerability databases.

8. The method as recited in claim 6, wherein the first VIC comprises one of: (a) a malicious software detector, (b) a configuration checker, (c) a network port scanner, (d) a log analyzer, or (e) a component of an identity management service.

9. The method as recited in claim 6, wherein the first extraction methodology comprises one of: (a) examining contents of one or more file systems, (b) examining contents of one or more main memories, (c) a network-based penetration test, (d) an analysis of a set of log file entries, (e) a simulation of a denial of service attack, (f) an identity masquerading attempt, or (g) an analysis of a set of performance metrics.

10. The method as recited in claim 6, further comprising:
storing, by the VRM at the first repository, a particular vulnerability record indicative of a behavioral pattern of one or more employees of an organization on behalf of which the VMS is deployed.

11. The method as recited in claim 6, wherein at least one monitored entity of the first group comprises a resource within a provider network, and wherein at least one monitored entity of the second group comprises a resource outside the provider network.

12. The method as recited in claim 6, wherein the first vulnerability record is formatted according to one of: (a) XML (Extensible Markup Language), (b) JSON (JavaScript Object Notation), (c) a data definitional language of a relational database system or (d) a data definition language of a non-relational database system.

13. The method as recited in claim 6, wherein the first vulnerability record comprises machine-readable instructions usable to re-obtain the first vulnerability data set.

14. The method as recited in claim 6, further comprising:
storing, at the first repository by the VRM, a set of acceptable configuration records usable to identify vulnerabilities resulting from configuration changes.

15. The method as recited in claim 6, further comprising:
storing, at the first repository by the VRM, a set of vulnerability definitions received programmatically from one or more trusted authorities.

16. The method as recited in claim 6, wherein the VMS comprises a plurality of repositories designated for respective levels of a plurality of levels of the monitoring targets hierarchy, wherein the first level comprises a set of monitored entities within a data center of a provider network, and wherein the second level comprises a set of monitored entities within an availability container of the provider network.

17. A non-transitory computer-accessible storage medium storing program instructions that when executed on one or more processors implements a vulnerability records manager (VRM) of a vulnerability management system (VMS), wherein the VRM is configured to:

receive an indication of a first vulnerability data set obtained from a first monitored entity of a distributed system by a first vulnerability information collector (VIC), wherein the first vulnerability data set includes values of a first set of attributes defined in a vulnerability taxonomy specification and at least one attribute not defined in the vulnerability taxonomy specification;

receive an indication of a second vulnerability data set obtained from a second monitored entity of the distributed system by a second VIC, wherein the second vulnerability data set includes values of a second set of attributes defined in the vulnerability taxonomy specification;

normalize the first and second vulnerability data sets into a first vulnerability record and a second vulnerability record respectively, so that the first and second vulnerability records share a common format that includes the first set of attributes and the second set of attributes;

store, at a first repository, the first vulnerability record corresponding to the first vulnerability data set and the second vulnerability record corresponding to the second vulnerability data set, wherein the first repository is designated for a first level of a monitoring targets hierarchy;

aggregate the first and second vulnerability records into a consolidated vulnerability record;

transmit the consolidated vulnerability record from the first repository to a second repository designated for a second level of the monitoring targets hierarchy; and transmit, in response to a programmatic request, contents of the consolidated vulnerability record to one or more of: (a) an automated risk analyzer or (b) a presentation component of the VMS.

18. The non-transitory computer-accessible storage medium as recited in claim 17, wherein the taxonomy specification defines respective attributes to identify one or more of: (a) a provider network at which a vulnerability data set is collected, (b) a network external to the provider network at which a vulnerability data set is collected, (c) an extraction methodology used for a vulnerability data set, or (d) references to vulnerability databases.

19. The non-transitory computer-accessible storage medium as recited in claim 17, wherein the first VIC comprises one of: (a) a malicious software detector, (b) a configuration checker, (c) a network port scanner, (d) a log analyzer, or (e) a component of an identity management service.

20. The non-transitory computer-accessible storage medium as recited in claim 17, wherein the VRM is configured to:
store, at the repository, a particular vulnerability record indicative of a behavioral pattern of one or more employees of an organization on behalf of which the VMS is deployed.

* * * * *